(12) United States Patent
Kopecek

(10) Patent No.: US 11,788,490 B1
(45) Date of Patent: Oct. 17, 2023

(54) TRAVELING FINGER LOCK FOR AN ACTUATOR

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/075,131

(22) Filed: Dec. 5, 2022

(51) Int. Cl.
F02K 1/76 (2006.01)
F16H 25/24 (2006.01)

(52) U.S. Cl.
CPC .............. *F02K 1/766* (2013.01); *F02K 1/763* (2013.01); *F16H 25/2454* (2013.01); *F05D 2220/323* (2013.01)

(58) Field of Classification Search
CPC ...... F02K 1/766; F02K 1/763; F16H 25/2454; F05D 2220/323
See application file for complete search history.

(56) References Cited

U.S. PATENT DOCUMENTS

| | | |
|---|---|---|
| 2,805,584 A | 9/1957 | Hinsey |
| 3,040,524 A | 6/1962 | Kurti |
| 3,186,308 A | 6/1965 | Butterworth |
| 3,344,604 A | 10/1967 | Mattia et al. |
| 3,444,783 A | 5/1969 | Fredd |
| 3,500,645 A | 3/1970 | Hom |
| 3,511,055 A | 5/1970 | Timms |
| 4,391,409 A | 7/1983 | Scholz |
| 4,421,349 A | 12/1983 | Greiert, Jr. |
| 4,922,713 A | 5/1990 | Barbarin et al. |
| 5,257,840 A | 11/1993 | Rouzaud |

(Continued)

FOREIGN PATENT DOCUMENTS

| | | |
|---|---|---|
| CN | 102611245 | 7/2017 |
| CN | 108884784 | 11/2018 |

(Continued)

OTHER PUBLICATIONS

International Preliminary Report on Patentability in International Appln. No. PCT/US2020/019902, dated Sep. 10, 2021, 10 pages.

(Continued)

*Primary Examiner* — Randell J Krug
(74) *Attorney, Agent, or Firm* — Fish & Richardson P.C.

(57) ABSTRACT

The subject matter of this specification can be embodied in, among other things, a linear actuator lock apparatus having a housing having an inner surface defining an axial cavity having a first housing portion where the axial cavity has a first lateral size, a second housing portion having a second, larger lateral size, and a face from the first housing portion to the second housing portion, a lock assembly having a lock carrier configured for movement within the cavity between a first position and a position, and a lock finger affixed to and extending away from the lock carrier, where the second finger end is configured to contact the face when extended and fit within the first housing portion when retracted, and a sleeve configured to move between a position in which the lock finger is permitted to extend and a position configured to contact and retract the lock finger.

26 Claims, 14 Drawing Sheets

(56) References Cited

U.S. PATENT DOCUMENTS

| | | | |
|---|---|---|---|
| 5,404,714 | A | 4/1995 | Davies |
| 5,431,085 | A | 7/1995 | Geffray |
| 5,642,636 | A | 7/1997 | Mitsui |
| 6,021,636 | A | 2/2000 | Johnson et al. |
| 6,089,626 | A | 7/2000 | Shoemaker |
| 6,487,846 | B1 | 12/2002 | Chakkera et al. |
| 6,517,041 | B2 | 2/2003 | Raum |
| 6,584,763 | B2 | 7/2003 | Lymons et al. |
| 6,786,039 | B2 * | 9/2004 | Chakkera ............... F02K 1/766 239/265.29 |
| 7,409,820 | B2 | 8/2008 | Ahrendt |
| 8,018,696 | B2 | 9/2011 | Ahrendt |
| 8,713,911 | B2 | 5/2014 | Kopecek et al. |
| 8,869,506 | B2 * | 10/2014 | Joret ........................ F02K 1/70 244/110 B |
| 8,919,668 | B2 | 12/2014 | Vauchel |
| 9,109,536 | B2 | 8/2015 | Willett |
| 9,249,756 | B2 | 2/2016 | Caruel |
| 9,458,794 | B2 | 10/2016 | Hue et al. |
| 9,587,516 | B2 | 3/2017 | Fabre et al. |
| 9,874,268 | B2 * | 1/2018 | Moradell-Casellas ...................... F16H 25/2204 |
| 10,054,079 | B2 | 8/2018 | Kopecek et al. |
| 10,513,300 | B2 * | 12/2019 | Bowers ................... B62K 3/02 |
| 10,677,194 | B2 | 6/2020 | Hawksworth et al. |
| 10,823,264 | B2 | 11/2020 | Hawksworth et al. |
| 10,865,738 | B2 | 12/2020 | Kopecek et al. |
| 11,378,037 | B2 * | 7/2022 | Song ....................... F02K 1/763 |
| 11,415,197 | B2 * | 8/2022 | Kopecek ............. F16H 37/041 |
| 11,486,334 | B2 * | 11/2022 | Burgess ................. F02K 1/766 |
| 11,512,665 | B2 * | 11/2022 | Miao ...................... F02K 1/763 |
| 11,591,986 | B2 * | 2/2023 | Polcuch ................. F16D 59/00 |
| 11,614,052 | B2 * | 3/2023 | Caruel ................... F02K 1/605 244/110 B |
| 2003/0218094 | A1 | 11/2003 | Lair |
| 2007/0273159 | A1 | 11/2007 | Rouyer |
| 2008/0073172 | A1 | 3/2008 | Ho |
| 2010/0089191 | A1 | 4/2010 | Marin Martinod |
| 2011/0318173 | A1 | 12/2011 | Ramlaoui et al. |
| 2012/0172174 | A1 * | 7/2012 | Kopecek ................ F02K 1/766 74/25 |
| 2013/0263600 | A1 | 10/2013 | Vauchel |
| 2013/0292489 | A1 | 11/2013 | Vauchel et al. |
| 2014/0270935 | A1 | 9/2014 | Willett |
| 2015/0267639 | A1 | 9/2015 | Gormley |
| 2018/0066607 | A1 | 3/2018 | Sawyers-Abbott et al. |
| 2018/0202390 | A1 | 8/2018 | Kopecek et al. |
| 2020/0271072 | A1 | 8/2020 | Kopecek et al. |

FOREIGN PATENT DOCUMENTS

| | | |
|---|---|---|
| EP | 1043492 | 10/2000 |
| EP | 1286037 A1 | 2/2003 |
| EP | 3284677 | 2/2018 |
| FR | 2970521 A1 | 7/2012 |
| GB | 404618 A | 1/1934 |
| WO | WO2001019674 | 3/2001 |
| WO | WO2005040589 | 5/2005 |
| WO | WO2014196985 | 12/2014 |
| WO | WO2015096000 | 7/2015 |
| WO | WO2016024274 | 2/2016 |

OTHER PUBLICATIONS

International Search Report and Written Opinion in the International Application No. PCT/US2020/019902, dated Jun. 22, 2020, 16 pages.

Office Action in European Appln. No. EP 20714764.6, dated Feb. 10, 2022, 5 pages.

Office Action in Chinese Appln. No 2020800315626, dated May 20, 2023, 19 pages (with English Translation).

Office Action in Chinese Appln. No 201980079670.8, dated Aug. 3, 2023, 27 pages.

* cited by examiner

TRAVELING FINGER LOCK FOR AN ACTUATOR

TECHNICAL FIELD

This instant specification relates to an aircraft engine thrust reverser lock.

BACKGROUND

Contemporary aircraft engines may include a thrust reverser actuation system to assist in reducing the aircraft speed during landing. Typical thrust reversers include a movable transcowl that, when in the active position, reverses at least a portion of the airflow passing through the engine.

Accidental or inadvertent activation and deployment of thrust reversers at inappropriate times can be dangerous or deadly. Accidental deployment on the ground while ground crews are performing service on the engine can result in injury or death. Accidental activation during flight can cause a catastrophic loss of airspeed or failure of the airframe. Mechanical malfunctions, such as a loss of motive force, can also allow a reverser to move out of the stowed position at an inappropriate time.

To prevent accidental or unintentional thrust reverser deployment, locking mechanisms are used. Before the thrust reverser can be moved from its stowed position, the lock must first be disengaged. Some current reverser lock designs implement rotating jaws to engage a probe. Such designs can be heavy and mechanically complex, which adds weight and maintenance requirements to the aircraft on which they are installed.

SUMMARY

In general, this document describes an aircraft engine thrust reverser lock.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an example embodiment, a linear actuator lock apparatus includes a housing having an inner surface defining an axial cavity having a first housing portion wherein the axial cavity has a first lateral size, a second housing portion wherein the axial cavity has a second lateral size that is larger than the first lateral size, and a face defined by the inner surface from the first housing portion to the second housing portion, a lock assembly having a lock carrier configured for axial movement within the axial cavity between a first lock carrier position and a second lock carrier position, and a lock finger affixed to the lock carrier at a first finger end and extending away from the lock carrier to a second finger end, wherein the second finger end is configured to contact the face axially and contact the lock carrier axially in an extended configuration and fit within the first housing portion in a retracted configuration, and a sleeve arranged within the second housing portion and configured to move axially within the second housing portion between a first sleeve position in which the lock finger is permitted to extend to the extended configuration and a second sleeve position configured to contact the lock finger and urge the lock finger to the retracted configuration.

Various embodiments can include some, all, or none of the following features. The second finger end can be configured to contact the face axially and to contact the lock carrier axially in the extended configuration. The lock finger can be configured to prevent movement of the lock carrier toward the second lock carrier position in the extended configuration, and permit movement of the lock carrier toward the second lock carrier position in the retracted configuration. The linear actuator lock apparatus can include a bias member configured to bias the lock finger away from the retracted configuration and toward the extended configuration. The sleeve can define an axial bore, and the second finger end can be configured to at least partly extend within the axial bore in the second sleeve position. The linear actuator lock apparatus can include a bias member configured to urge the sleeve toward the first sleeve position. The linear actuator lock apparatus can include a rotary-to-linear motion converter assembly having a threaded shaft and a nut threadedly engaged upon the threaded shaft, wherein the nut is configured to urge axial movement of the lock carrier within the axial cavity. The nut can be further configured to urge axial movement of a piston rod. The housing can be configured to be affixed to an aircraft structure and a piston rod can be configured to be affixed to a moveable aircraft component. The linear actuator lock apparatus can include an electric motor configured to urge rotation of the threaded shaft. The linear actuator lock apparatus can include a second rotary-to-linear motion converter configured to urge the sleeve from the first sleeve position toward the second sleeve position, the rotary-to-linear motion converter assembly having a planetary gearbox assembly having a sun gear assembly configured to receive rotary motion from a rotary actuator, a collection of planet gears configured to be driven by the sun gear assembly, a ring gear assembly having a collection of gear teeth configured to engage the collection of planet gears extending radially inward, and a screw thread extending radially outward, and a planet gear carrier assembly configured to be driven by the collection of planet gears and configured to (1) urge rotation of the threaded shaft in a first configuration and (2) urge rotation of the ring gear assembly in a second configuration, and a lock driver assembly having a collection of teeth configured to be engaged by the screw thread and to move linearly based on rotation of the ring gear assembly, wherein linear movement of the lock driver assembly is configured to urge movement of the sleeve. The sleeve can be configured to be urged from the first sleeve position toward the second sleeve position by an electromechanical actuator.

In an example implementation, a method of locking a linear actuator includes urging axial movement of a lock carrier within an axial cavity defined by an inner surface of a housing, away from a first lock carrier position and toward a second lock carrier position, urging, by the lock carrier, axial movement of a lock finger affixed to the lock carrier at a first finger end and extending away from the lock carrier to a second finger end in an extended configuration, contacting, by the second finger end, a face defined by the inner surface between a first housing portion wherein the axial cavity has a first lateral size to a second housing portion wherein the axial cavity has a second lateral size that is larger than the first lateral size, preventing, by the contacting, movement of the lock carrier to the second lock carrier position, the preventing including contacting, by the second finger end, a second face defined by the lock carrier, and transferring, by the second finger end, an axial force of the lock carrier to the housing, urging movement of a sleeve axially from a first sleeve position to a second sleeve position within the axial cavity, contacting, by the sleeve, the lock finger, urging, by the sleeve, the lock finger from the extended configuration to a retracted configuration in which the lock finger fits within the first housing portion, and moving the lock carrier to the second lock carrier position.

Various implementations can include some, all, or none of the following features. The method can include urging, by a nut engaged upon a threaded shaft of a rotary-to-linear motion converter assembly, axial movement of the lock carrier within the axial cavity. The method can include urging, by an electric motor, rotary motion of the threaded shaft, and urging, by rotary motion of the threaded shaft, linear movement of the nut. The method can include urging, by linear movement of the nut, axial motion of a piston. The method can include urging rotation of the threaded shaft by a planetary gearbox assembly in a first configuration, urging rotation of a ring gear assembly of the planetary gearbox assembly in a second configuration, urging, based on rotation of the ring gear assembly, linear movement of a lock driver assembly of a rotary-to-linear motion converter assembly, and urging axial movement of the sleeve based on linear movement of the lock driver assembly. The method can include urging movement of the sleeve by a bias member. The method can include urging movement of the sleeve axially from the second sleeve position to the first sleeve position within the axial cavity, urging the lock carrier away from the second lock carrier position to the first lock carrier position, passing the second finger end out of the first housing portion, past the face, into the second housing portion, and extending the lock finger away from the lock carrier from the retracted configuration to the extended configuration. The method can include extending, by a bias member, the lock finger away from the lock carrier from the retracted configuration to the extended configuration. The method can include urging, by an electromechanical actuator, axial movement of the sleeve. The method can include urging movement of the sleeve by a bias member configured to urge movement of the sleeve axially from the second sleeve position to the first sleeve position.

In another example embodiments, a thrust reverser actuator system includes an airframe structure, a thrust reverser cowl configured to move relative to the airframe structure, a linear actuator configured to move the thrust reverser cowl relative to the airframe structure, and includes a housing having an inner surface defining an axial cavity having a first housing portion wherein the axial cavity has a first lateral size, a second housing portion wherein the axial cavity has a second lateral size that is larger than the first lateral size, and a face defined by the inner surface from the first housing portion to the second housing portion, a lock carrier configured for axial movement within the axial cavity between a first lock carrier position and a second lock carrier position, and a lock apparatus having a lock finger affixed to the lock carrier at a first finger end and extending away from the lock carrier to a second finger end, wherein the second finger end is configured to contact the face axially and contact the lock carrier axially in an extended configuration and fit within the first housing portion in a retracted configuration, and a sleeve arranged within the second housing portion and configured to move axially within the second housing portion between a first sleeve position in which the lock finger is permitted to extend to the extended configuration and a second sleeve position configured to contact the lock finger and urge the lock finger to the retracted configuration.

Various embodiments can include some, all, or none of the following features. The lock finger can be configured to prevent movement of the lock carrier toward the second lock carrier position in the extended configuration, and permit movement of the lock carrier toward the second lock carrier position in the retracted configuration. The thrust reverser actuator system can include an electromechanical actuator, wherein the lock carrier is configured to be urged from the first lock carrier position toward the second lock carrier position by electromechanical force. The thrust reverser actuator system can include a second rotary-to-linear motion converter configured to urge the sleeve from the first sleeve position toward the second sleeve position, the second rotary-to-linear motion converter having a planetary gearbox assembly having a sun gear assembly configured to receive rotary motion from a rotary actuator, a collection of planet gears configured to be driven by the sun gear assembly, a ring gear assembly having a collection of gear teeth configured to engage the collection of planet gears extending radially inward, and a screw thread extending radially outward, and a planet gear carrier assembly configured to be driven by the collection of planet gears and configured to urge rotation of the ring gear assembly, and a lock driver assembly having a collection of teeth configured to be engaged by the screw thread and to move linearly based on rotation of the ring gear assembly, wherein linear movement of the lock driver assembly is configured to urge movement of the sleeve.

The systems and techniques described here may provide one or more of the following advantages. First, a system can provide a lock mechanism having a short lock load path. Second, the system is less prone to fatigue due to the flexure. Third, the lock fingers are not size-limited by flexure requirements. Fourth, lock loads do not use the lock fingers as a primary load path.

The details of one or more implementations are set forth in the accompanying drawings and the description below. Other features and advantages will be apparent from the description and drawings, and from the claims.

DETAILED DESCRIPTION

This document describes systems and techniques for reversing aircraft turbine engine airflow. A thrust reverser with at least one movable element, which is movable to and from a reversing position, may be used to change the direction of the bypass airflow. In the reversing position, the movable element may be configured to reverse at least a portion of the bypass airflow.

Locking mechanisms engage the thrust reversers to prevent accidental activation or accidental deployment (e.g., during flight, during ground maintenance operations). The paragraphs below describe a mechanism that provides such locking in an assembly that is relatively lighter and less complex than existing designs.

Figure 1:
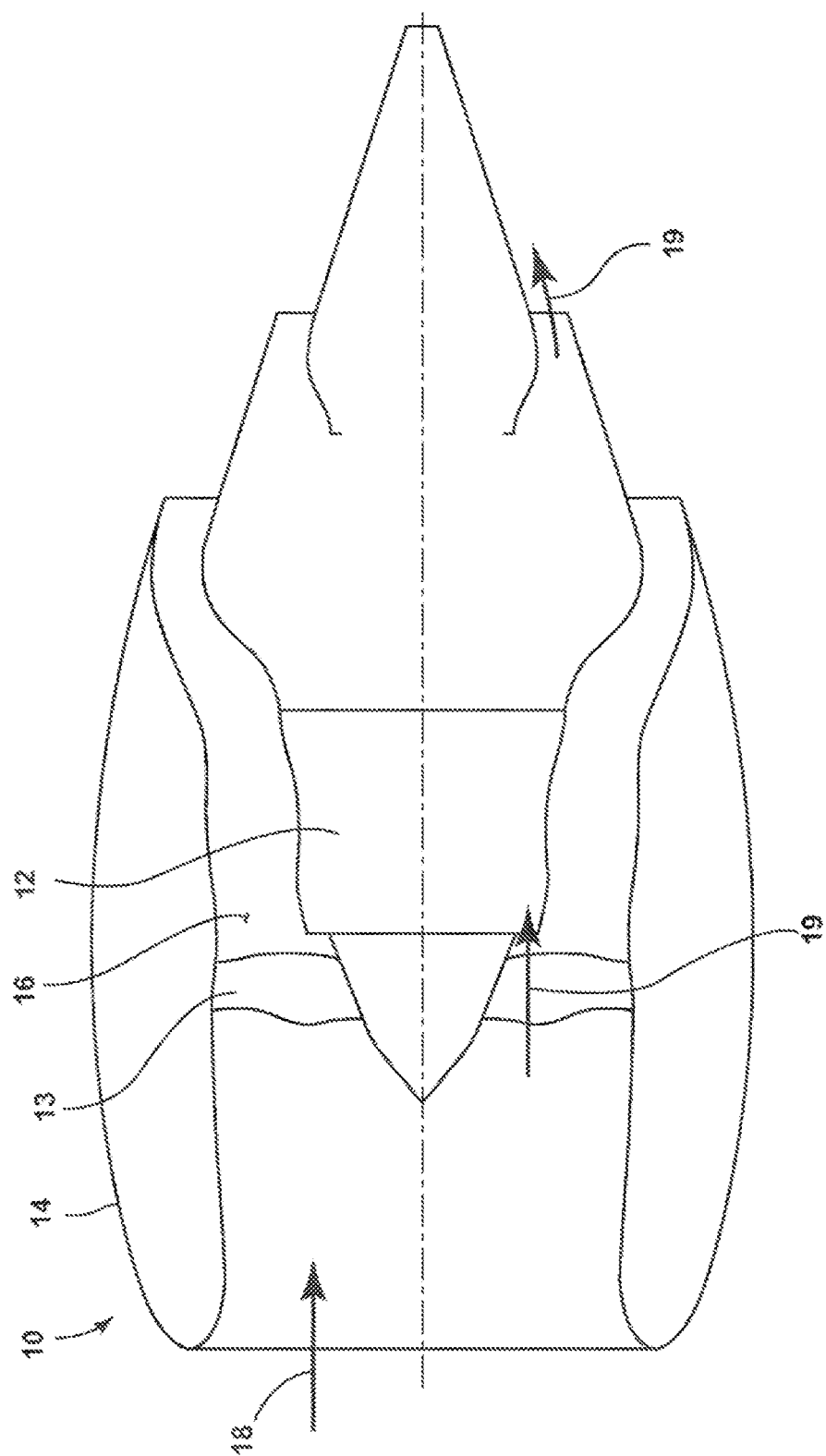
FIG. 1 is a schematic view of an example turbofan jet engine with a portion of the outer nacelle cut away for clarity.

FIG. 1 illustrates an example turbofan jet engine assembly 10 having a turbine engine 12, a fan assembly 13, and a nacelle 14 (e.g., an airframe structure). Portions of the nacelle 14 have been cut away for clarity. The nacelle 14 surrounds the turbine engine 12 and defines an annular airflow path or annular bypass duct 16 through the turbofan jet engine assembly 10 to define a generally forward-to-aft bypass airflow path as schematically illustrated by the arrow 18. A combustion airflow is schematically illustrated by the arrows 19.

Figure 2:
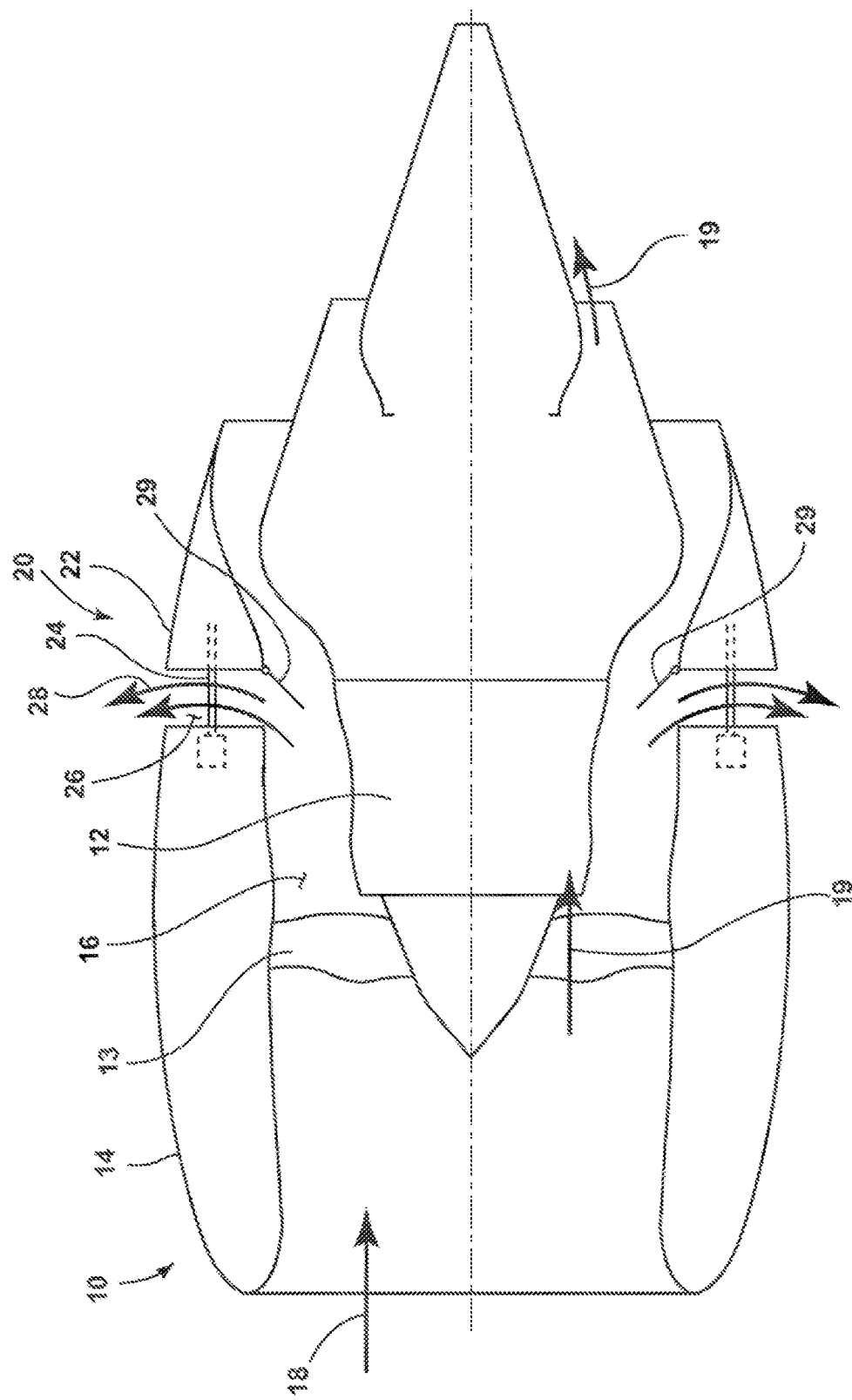
FIG. 2 is a schematic view of the engine of FIG. 1 with an exemplary thrust reverser.

A thrust reverser actuator system with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a thrust reverser cowl portion that is capable of axial motion with respect to the forward portion of the nacelle 14. A linear electromechanical actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap (also known as a blocker door) 29 may be included to aid in directing the airflow path between the movable element 22 and the forward portion of the nacelle 14.

Figure 3:
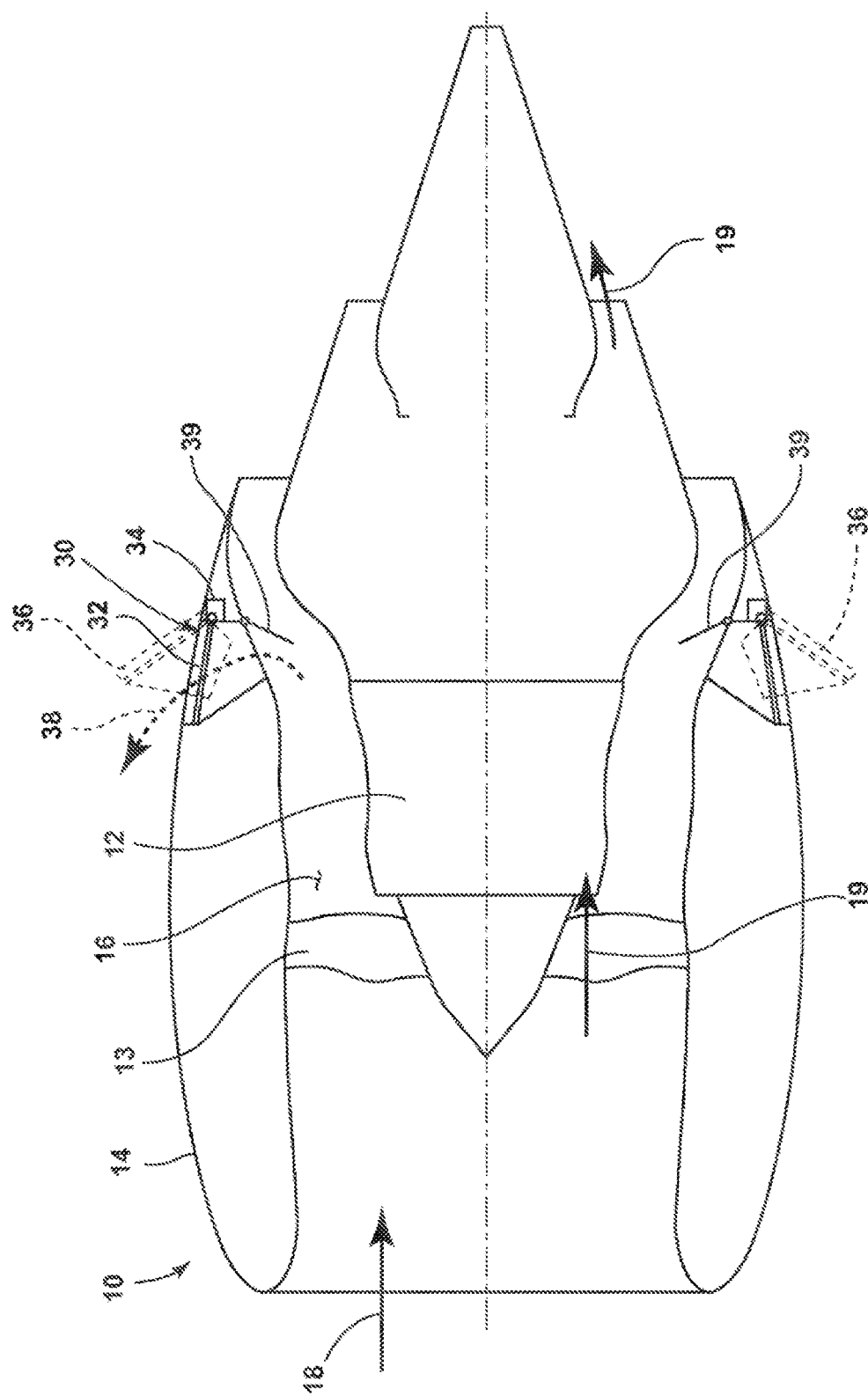
FIG. 3 is a schematic view of the engine of FIG. 1 with an alternative exemplary thrust reverser.

FIG. 3 schematically illustrates an alternative example of a thrust reverser actuator system 30. The thrust reverser actuator system 30 includes a movable element 32. The movable element 32 has been illustrated as a deflector, which may be built into a portion of the nacelle 14. A linear electromechanical actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector, blocker door, or flap 39 may be included to aid in directing the airflow path outward.

In both illustrative examples, the thrust reverser changes the direction of the thrust force. Both the thrust reverser 20 and the thrust reverser actuator system 30 have been described as electromechanically operated systems and an electromechanical actuator has been schematically illustrated. In some embodiments, the thrust reverser 20 and/or the thrust reverser actuator system 30 can be powered by hydraulics, pneumatics, or by any other appropriate power source or actuator type.

Figure 4:
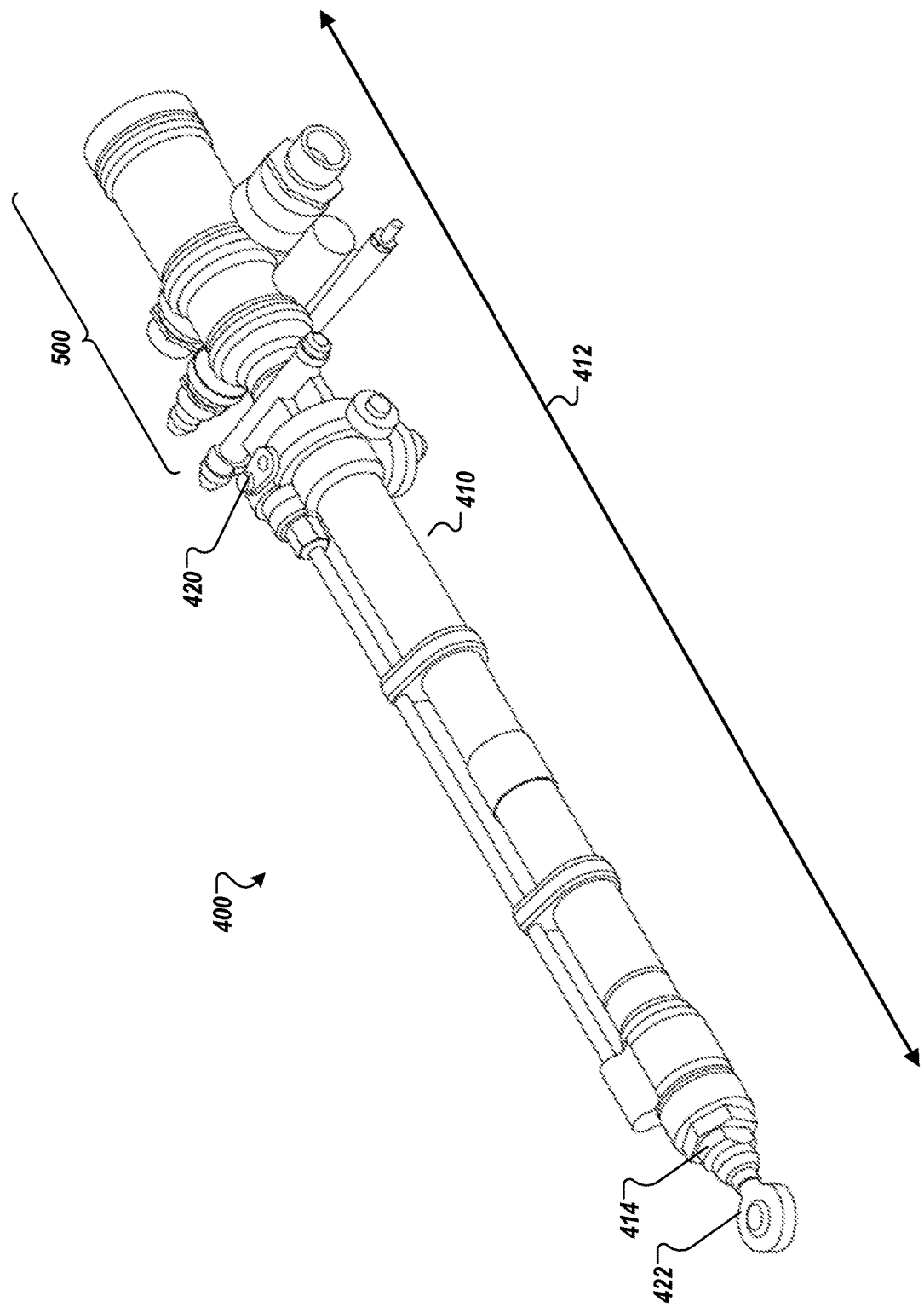
FIG. 4 is a projected view of an example linear electromechanical actuator.

FIG. 4 is a projected view of an exemplary linear electromechanical actuator 400. In some examples, the linear electromechanical actuator 400 can be the linear electromechanical actuator 24 of FIG. 2 or the linear electromechanical actuator 34 of FIG. 3.

The linear electromechanical actuator 400 includes a housing 410 having an axial length, represented by arrow 412. The linear electromechanical actuator 400 is configured as a linear actuator, in which a piston rod 414 can be extended and retracted axially relative to the housing 410.

The linear electromechanical actuator 400 includes a mount 420 that is configured for attachment to an aircraft or airframe structure, such as the example nacelle 14. The linear electromechanical actuator 400 also includes a mount 422 that is configured for attachment to a moveable aircraft structure or component, such as the example movable element 22. In use, axial movement of the piston rod 414 causes axial movement of the movable element 22 relative to the nacelle 14.

As will be discussed in the descriptions of FIGS. 5-13, the housing 410 houses a rotary actuator (e.g., an electric motor) and a rotary-to-linear motion converter assembly to perform moving and locking operations of the linear actuator. The linear electromechanical actuator 400 also includes a linear lock assembly 500 that is configured to selectively prevent and allow axial movement of the piston rod 414. The remainder of this specification discusses the linear lock assembly 500 in more detail.

Figure 5:
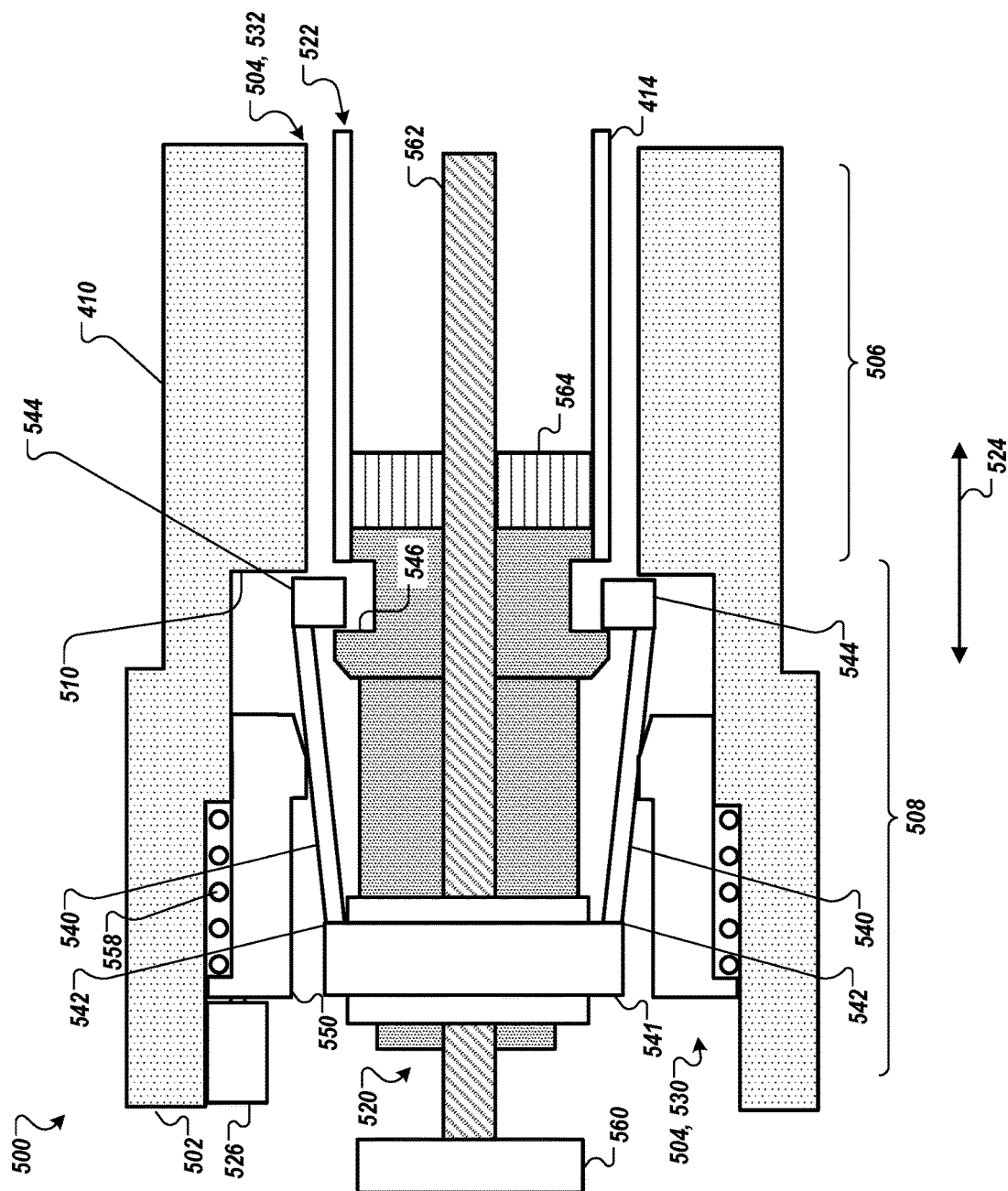
FIGS. 5-9 are sectional views of an example linear lock assembly.

FIGS. 5-9 are sectional side views of the exemplary linear lock assembly 500 (e.g., linear actuator lock apparatus) in various operational configurations. FIG. 5 shows the linear lock assembly in a locked configuration. The views of FIGS. 5-9 shows a portion of the housing 410 and a portion of the piston rod 414.

The housing 410 has an inner surface 502 defining an axial cavity 504. The housing 410 includes a housing portion 506 and a housing portion 508. Along the interior of the housing portion 506, the axial cavity 504 has a first lateral size (e.g., diameter, cross sectional area). Along the interior of the housing portion 508, the axial cavity 504 has a second lateral size that is larger than the first lateral size (e.g., has a relatively larger diameter or cross-sectional area). At a junction where the housing portion 506 and the housing portion 508 meet, a face 510 is defined by the radial transition of inner surface 502 from the relatively smaller interior cavity size of the housing portion 506 to the relatively lager interior cavity size of the housing portion 508.

Figure 6:
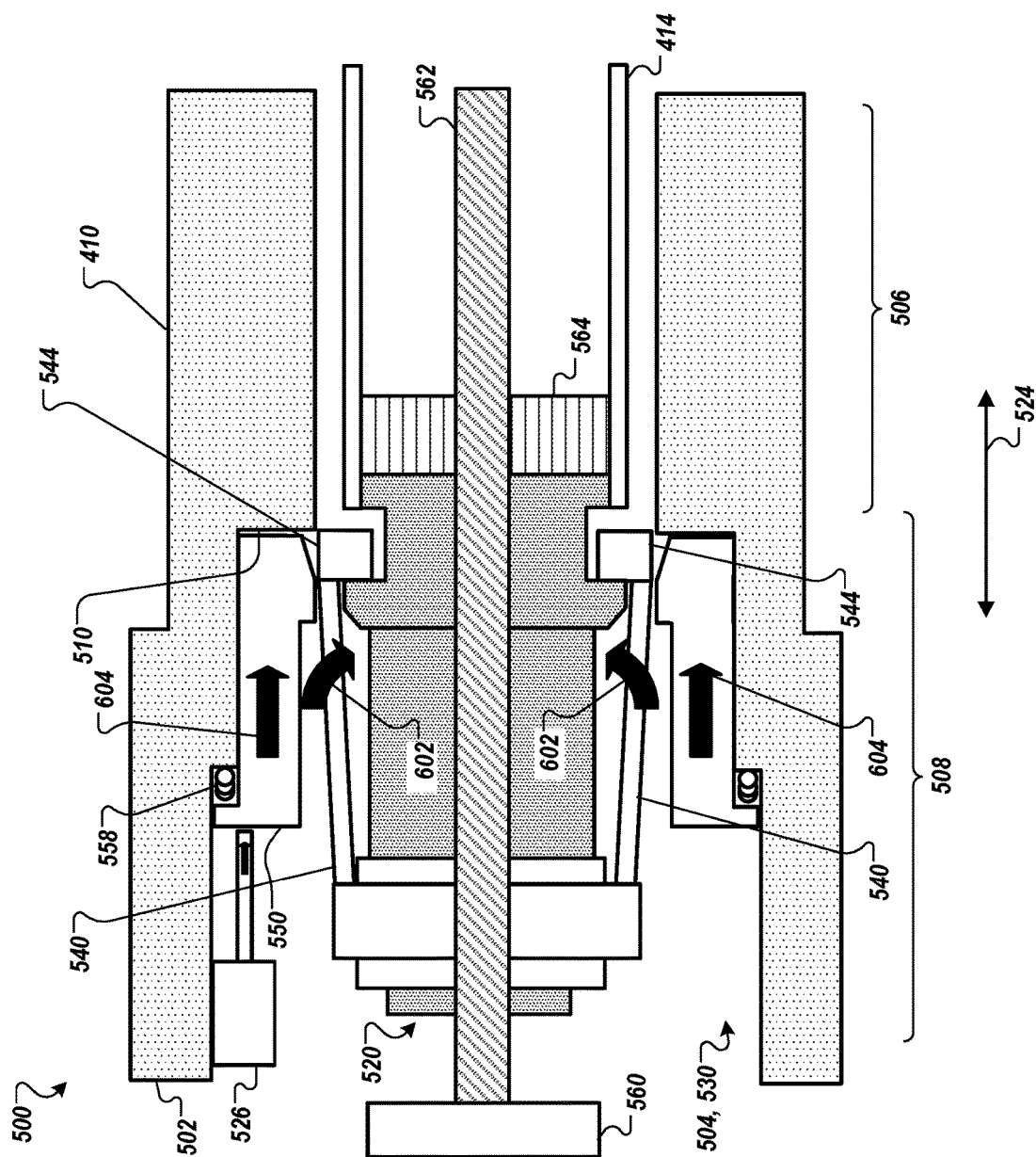
Figure 7:
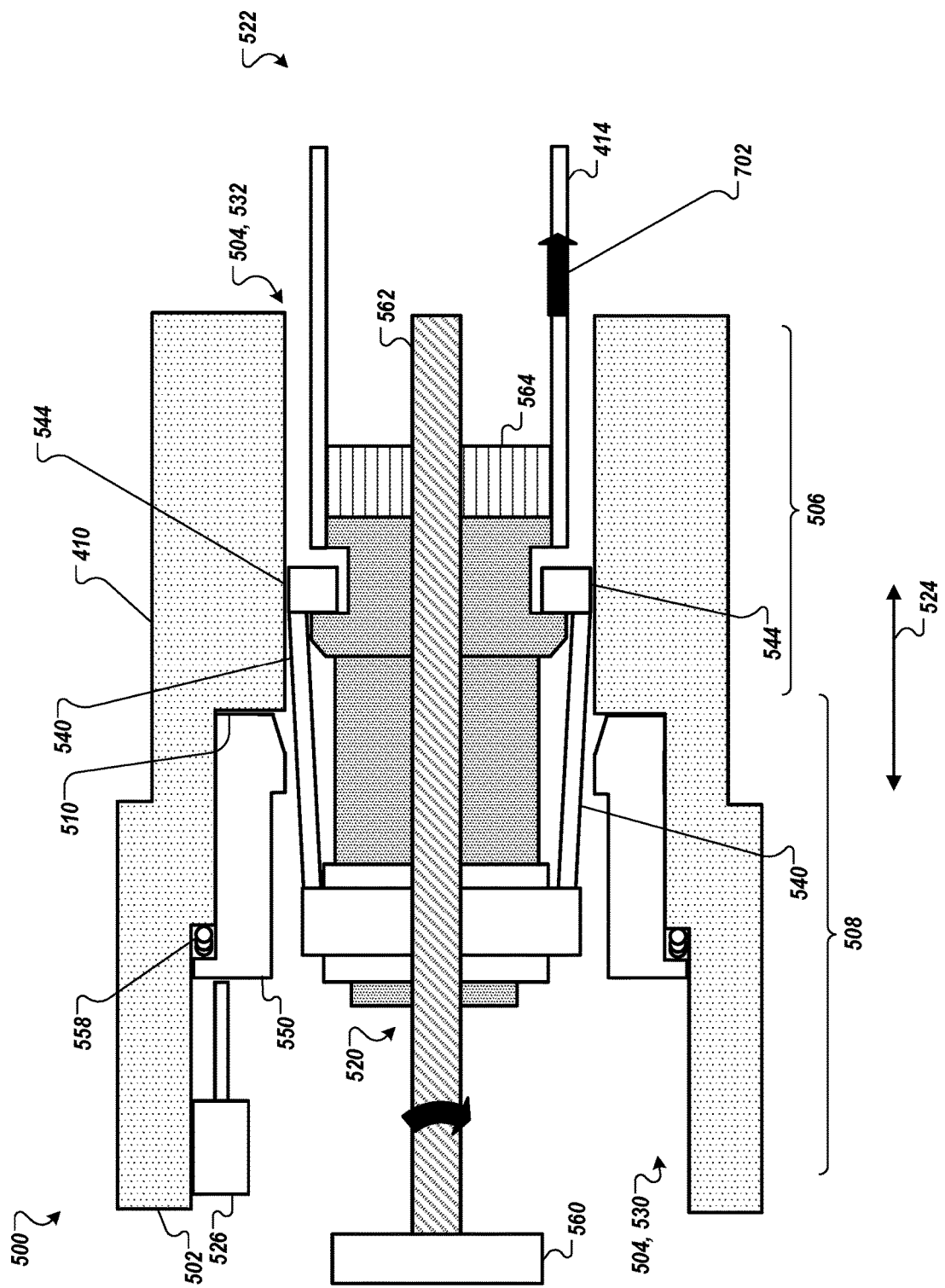
Figure 8:
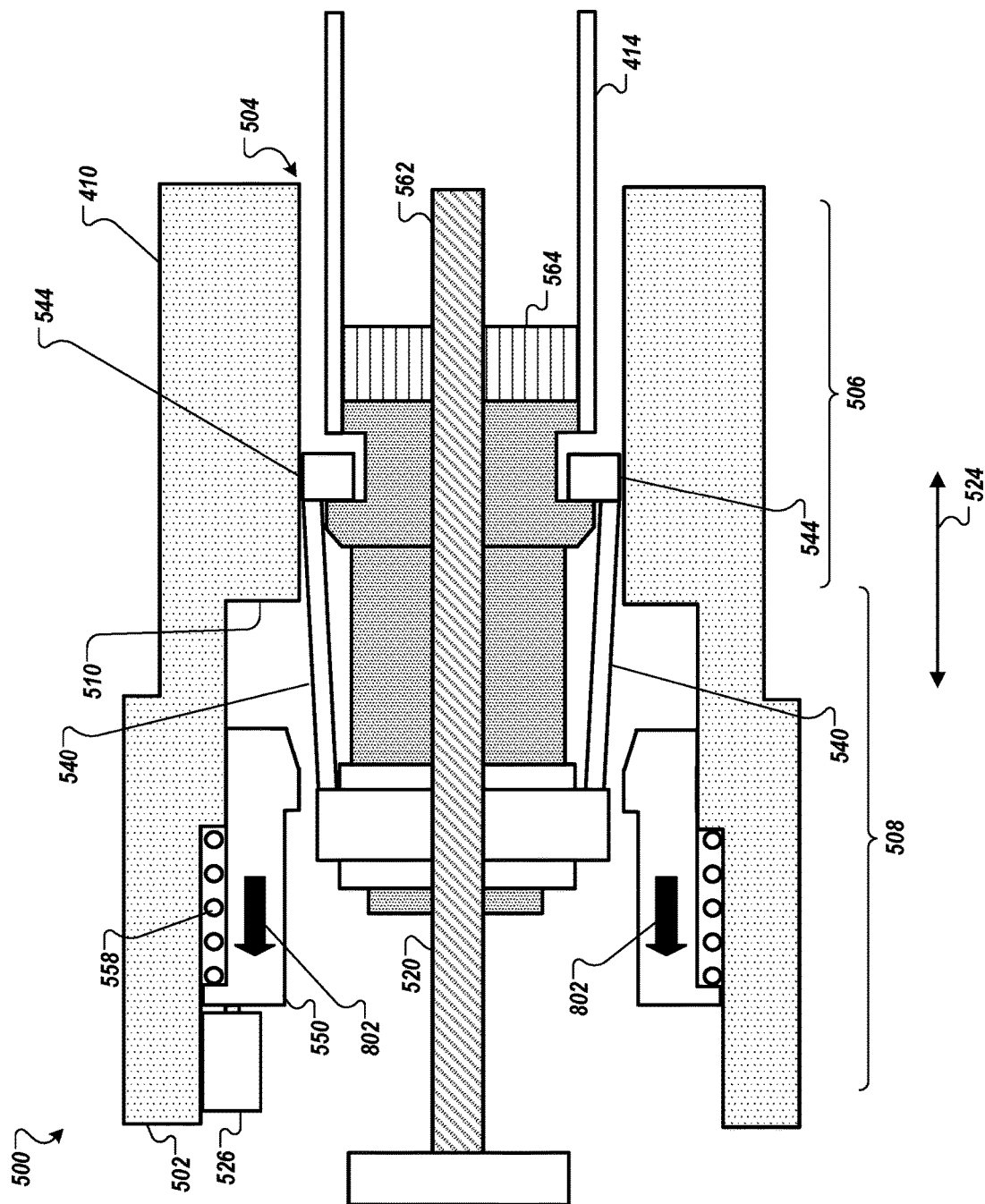
Figure 9:
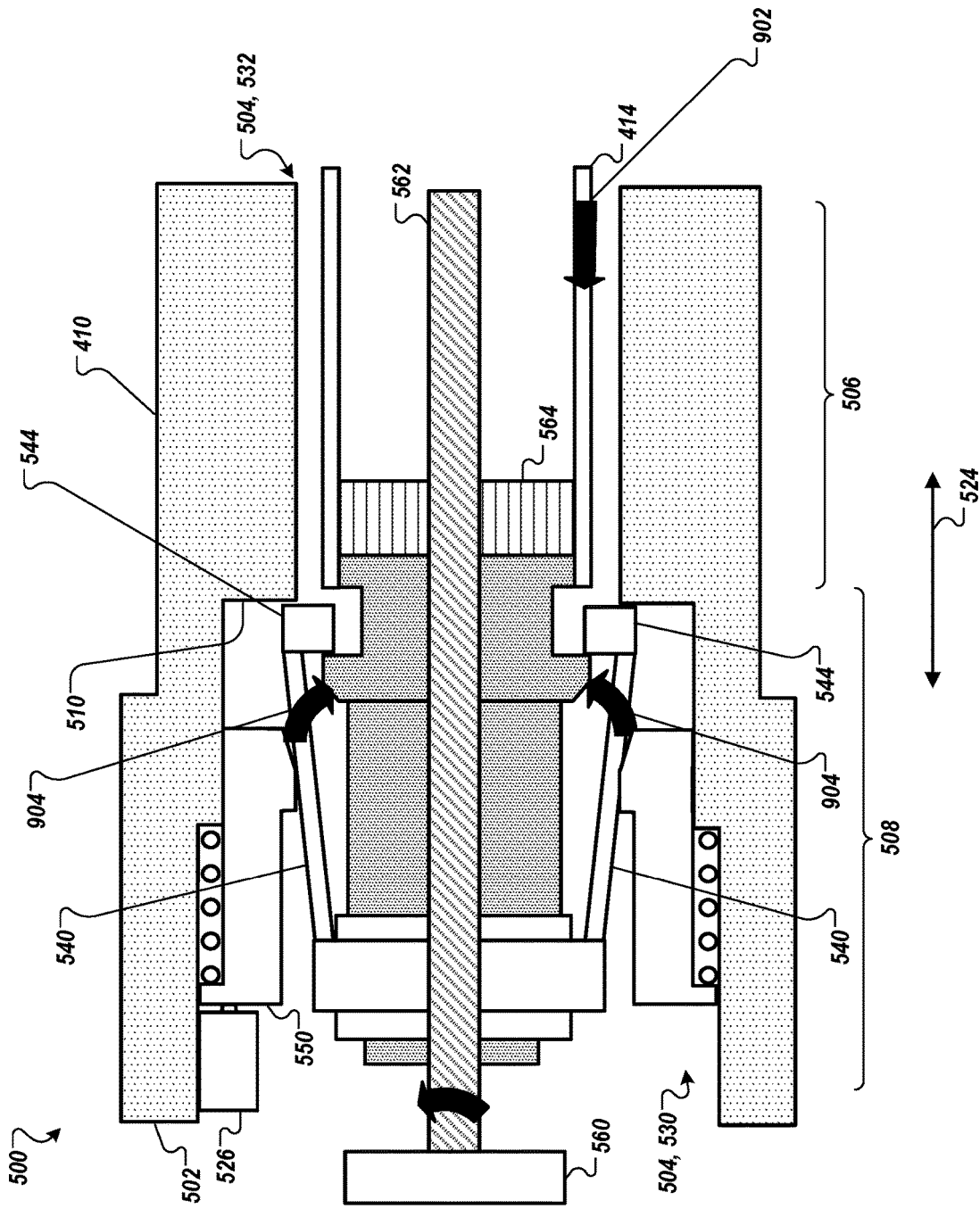

The piston rod 414 has a piston end 520 and a piston end 522 axially opposite the piston end 520. The piston rod 414 is configured for axial movement along an axial direction, represented by arrow 524 within the axial cavity 504 between a first piston position (e.g., as shown in FIGS. 5, 6, and 9) and a second piston position (e.g., as shown in FIGS. 7-8).

A motor 560 (e.g., an electric motor) is configured to provide electromechanical force to rotate a threaded shaft 562. The piston rod 414 is affixed to a nut 564 (e.g., a ballnut) configured to threadedly engage with the threaded shaft 562 to form a ballscrew apparatus that is configured to convert rotary motion, provided by the motor 560, of the threaded shaft 562 into linear motion of the nut 564 and the piston rod 414.

In operation, the piston rod 414 can be extended when the motor 560 is energized to rotate the threaded shaft 562 in a first direction (e.g., clockwise), and can be retracted by energizing the motor 560 to rotate the threaded shaft 562 in a second, opposite direction (e.g., counter-clockwise).

Each of a collection of lock fingers 540 are affixed to a lock carrier 541 at the piston end 520 at a finger end 542 and extend away from the piston rod 414 to a finger end 544. The finger end 544 is configured to contact the face 510 when the lock finger 540 is in an extended configuration (e.g., as shown in FIGS. 5 and 9), and fit within the housing portion 506 when the lock finger 540 is in a retracted configuration (e.g., as shown in FIGS. 6-8). The lock carrier 541 is affixed to the piston rod 414 proximal to the piston end 520, and as the piston rod 414 extends and retracts the lock carrier 541 is moved between a first lock carrier position and a second lock carrier position.

The lock fingers 540 are configured to be biased toward the locked configuration. In some embodiments, the finger ends 542 can be fixed to the piston end 520 and the lock finger 540 can be formed of a compliant (e.g., spring) material that can bend and allow the finger end 544 to move between the extended and retracted positions. In some embodiments, the lock finger 540 can be substantially rigid and the finger ends 542 can be configured to pivot or hinge at the piston end 520, and a spring or other compliant material can be configured to bias the finger end 544 toward the extended position.

A sleeve 550 is arranged within the second housing portion and configured to move axially within the housing portion 508 between a first sleeve position (e.g., as shown in FIGS. 5, 8, and 9) in which the lock fingers 540 are permitted to extend to the extended configuration, and a second sleeve position configured to contact the lock fingers 540 and urge the lock fingers 540 to the retracted configuration (e.g., as shown in FIGS. 6 and 7).

A bias member 558 (e.g., a spring) is configured to bias the sleeve 550 toward the first sleeve position. In the illustrated embodiment, the sleeve 550 is moved from the first sleeve position to the second sleeve position by energizing a linear actuator 526 (e.g., an electrical or fluid-powered solenoid).

With reference to FIGS. 5-9, an example operational cycle of the linear lock assembly 500 will be described. In FIG. 5, the piston rod 414 is shown in a retracted configuration and the linear lock assembly 500 is shown in a locked configuration. In the locked configuration, the piston rod 414 is prevented from extending by the finger ends 544. If an attempt were made to extend the piston rod 414 with the lock fingers 540 in the extended, locked configuration, the finger ends 544 come into interfering contact with the face 510. Extensile movement of the piston rod 414 is prevented in at least one of two different ways.

In one example, an axially leading side of one or more of the finger ends 544 can contact the face 510, and an axial face portion 546 of the piston can contact an axially trailing side of the finger end 544. As such, the axial force acting upon the piston rod 414 is transferred through the axial face portion 546, to the finger end 544, to the face 510 of the housing 410. Such mechanical interference substantially prevents the piston rod 414 from extending further.

In another example, the force acting upon the piston rod 414 can be transferred through the finger end 542, along the lock finger 540 to the finger end 544, and then to the face 510 of the housing 410. Such mechanical interference substantially prevents the piston rod 414 from extending further.

Referring now to FIG. 6, the piston rod 414 is shown in a retracted configuration and the linear lock assembly 500 is shown in an unlocked configuration. In the unlocked configuration, the lock fingers 540 are retracted (as represented by arrows 602) such that the finger ends 544 fit within the axial cavity 504 of the housing portion 506.

The lock fingers 540 are moved from the locked configuration (e.g., shown in FIG. 5) to the unlocked configuration (e.g., shown in FIG. 6) by the sleeve 550. The linear actuator 526 is activated to urge axial movement, represented by arrows 604, of the sleeve 550 from the locked position (e.g., as shown in FIG. 5) to the unlocked position (e.g., as shown in FIG. 6). As the sleeve 550 moves, the sleeve 550 contacts the lock fingers 540 and urges the retraction of the lock fingers 540 from the extended, locked configuration to the retracted, unlocked configuration.

Referring now to FIG. 7, the piston rod 414 is shown in an extended configuration with the linear lock assembly 500 shown in an unlocked configuration. In operation, lock carrier 541 and the piston rod 414 can be urged from the retracted position toward the extended position by rotation of the motor 560. With the lock fingers in the retracted, unlocked configuration, the finger ends 544 fit within the axial cavity 504 of the housing portion 506 and do not come into mechanical contact with the face 510 as the piston rod 414 is moved, as represented by arrow 702, from the retracted position (e.g., as shown in FIGS. 5 and 6) toward an extended position (e.g., as shown in FIG. 7).

Referring now to FIG. 8, the piston rod 414 is shown in an extended configuration with the linear lock assembly 500 shown in the unlocked configuration and the sleeve 550 in the locked position. When the piston rod 414 is in the extended configuration, the finger ends 544 fit within the axial cavity 504 of the housing portion 506. The axial cavity 504 prevents the finger ends 544 from extending due to the bias of the lock fingers 540, and as such keeps the lock fingers 540 retracted regardless of the position of the sleeve 550.

In the current example, with the lock fingers 540 held in the unlocked position by the axial cavity 504, the sleeve 550 can be moved without affecting the configuration of the lock fingers 540. The sleeve 550 can be moved away, as represented by arrows 802, from the unlocked configuration (e.g., as shown in FIGS. 6 and 7) toward the locked configuration (e.g., as shown in FIGS. 5, 8, and 9) by de-energizing the linear actuator 526 and permitting the bias member 558 to urge axial movement of the sleeve 550 toward the locked position.

Referring now to FIG. 9, the piston rod 414 is shown in the retracted configuration with the linear lock assembly 500 shown in the locked configuration and the sleeve 550 in the locked position. In operation, the piston rod 414 can be urged from the extended position toward the retracted position by energizing the motor 560 to rotate the threaded shaft 562. With the lock fingers in the retracted, unlocked configuration, the finger ends 544 fit within the axial cavity 504 of the housing portion 506 and will be kept in the unlocked configuration. As the piston rod 414 is moved, as represented by arrow 902, from the extended position (e.g., as shown in FIGS. 7 and 8) toward an extended position (e.g., as shown in FIGS. 5, 6, and 9), the finger ends 544 eventually pass out of the housing portion 506 into the housing portion 508. Once the finger ends 544 have cleared the housing portion 506, the axial cavity 504 will no longer retain the lock fingers 540 in the unlocked position against the bias of the lock fingers 540. As such, the bias of the lock fingers 540 causes the lock fingers 540 to extend, as represented by arrows 904, to the locked configuration.

FIGS. 10-13 are sectional views of another example linear lock assembly 1000 in various operational configurations. In the illustrated example, the linear lock assembly 1000 is shown and will be described below as a modification of the example linear lock assembly 500 of FIGS. 4-9. In some embodiments, the linear lock assembly 1000 can be used in place of the example linear lock assembly 500 or used interchangeably with the linear lock assembly 500.

In general, the linear lock assembly 1000 is substantially similar to the example linear lock assembly 500, in which the linear actuator 526 has been replaced by a lock driver assembly 1001 that is actuated by a planetary gearbox assembly 1002, and the threaded shaft 562 has been replaced by a threaded shaft 1062 that is driven by the motor 560 through the planetary gearbox assembly 1002.

Figure 10:
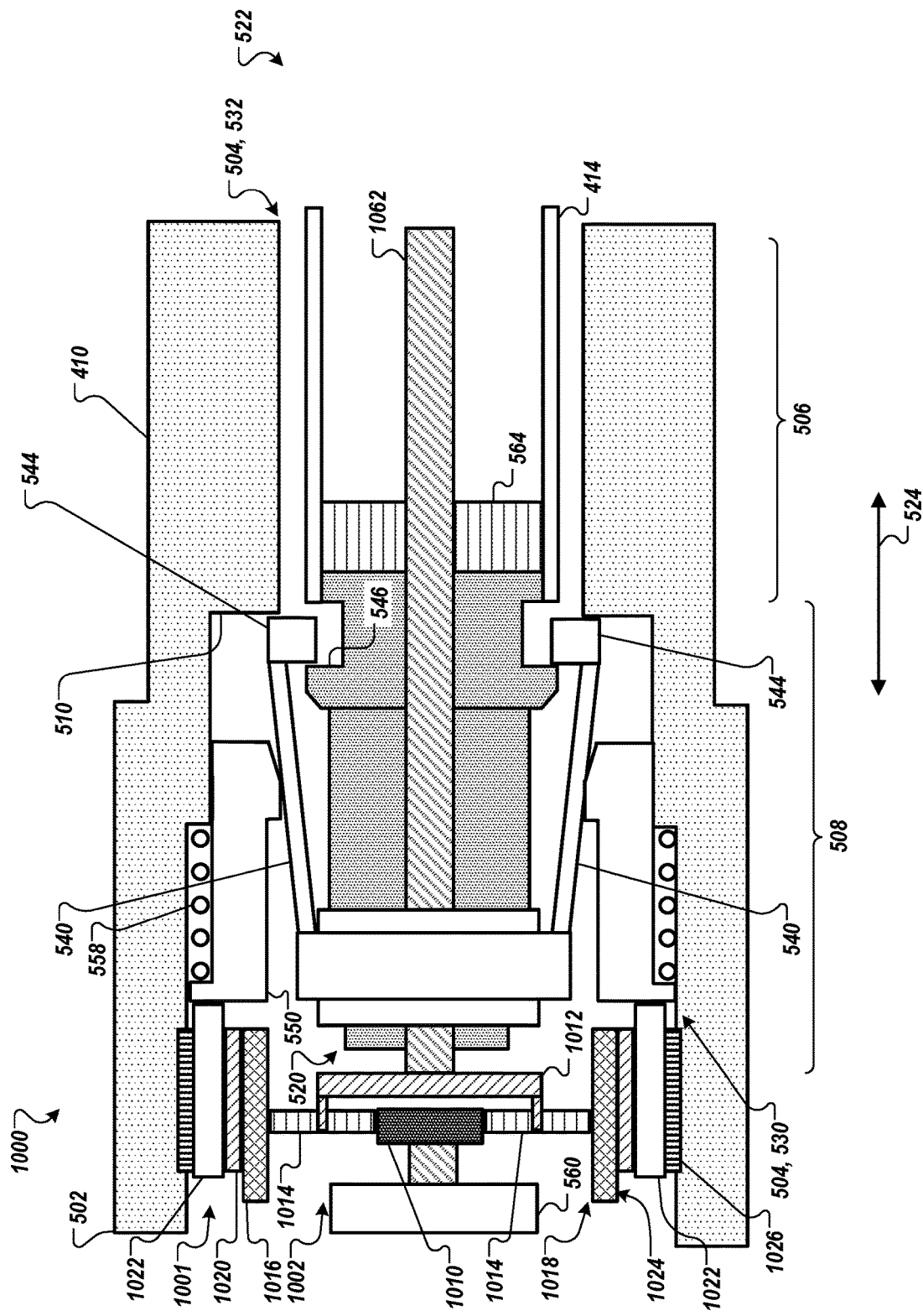
FIGS. 10-13 are sectional views of another example linear lock assembly.

FIG. 10 shows the linear lock assembly 1000 in a locked configuration. The motor 560 (e.g., an electric motor) is configured to rotate a sun gear assembly 1010 of the planetary gearbox assembly 1002. The piston rod 414 is affixed to the nut 564 (e.g., a ballnut) configured to threadedly engage with the threaded shaft 1062 to form a ballscrew apparatus that is configured to convert rotary motion, provided by a planet gear carrier assembly 1012, of the threaded shaft 1062 into linear motion of the nut 564 and the piston rod 414. The planetary gearbox assembly 1002 includes the sun gear assembly 1010, which is configured to urge rotation of a collection of planet gears 1014 carried by the planet gear carrier assembly 1012 and/or rotation of a ring gear assembly 1016 based on rotary motion provided by the motor 560.

The ring gear assembly 1016 includes a collection of gear teeth 1018 extending inwardly and configured to engage corresponding teeth of the planet gears 1014. The ring gear assembly 1016 also includes a screw thread 1020 extending radially outward. The lock driver assembly 1001 includes a lock driver 1022 having a collection of teeth 1024 configured to be engaged by the screw thread 1020 and to move linearly based on rotation of the ring gear assembly 1016. A collection of splines 1026 are configured to resist rotational movement of the lock driver 1022 and guide axial linear movement of the lock driver 1022 in order to urge axial movement of the sleeve 550.

Figure 11:
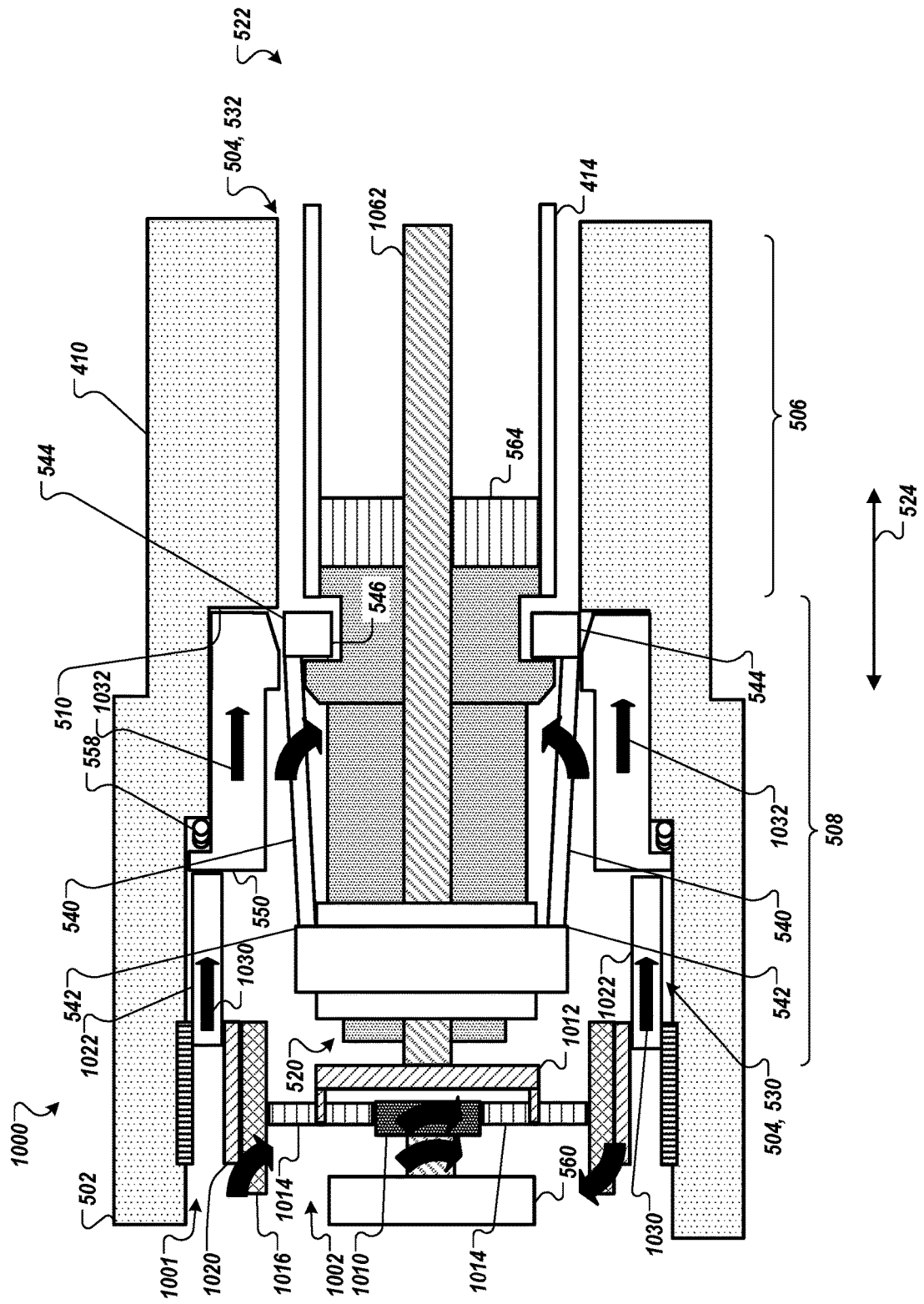

Referring now to FIG. 11, in operation, the motor 560 urges rotation of the sun gear assembly 1010, which in turn urges rotation of the collection of planet gears 1014. Rotation of the planet gears 1014 urges rotation of the ring gear assembly 1016 and the planet gear carrier assembly 1012. However, with the lock fingers 540 in the extended configuration, movement of the piston rod 414, the threaded shaft 1062, and the planet gear carrier assembly 1012 is substantially prevented, causing substantially all of the torque from the sun gear assembly 1010 to cause rotation of the ring gear assembly 1016. Rotation of the ring gear assembly 1016 urges linear movement of the lock driver 1022, as indicated by arrows 1030, into contact with the sleeve 550, as indicated by arrows 1032, causing the lock fingers 540 to retract to the retracted configuration.

Figure 12:
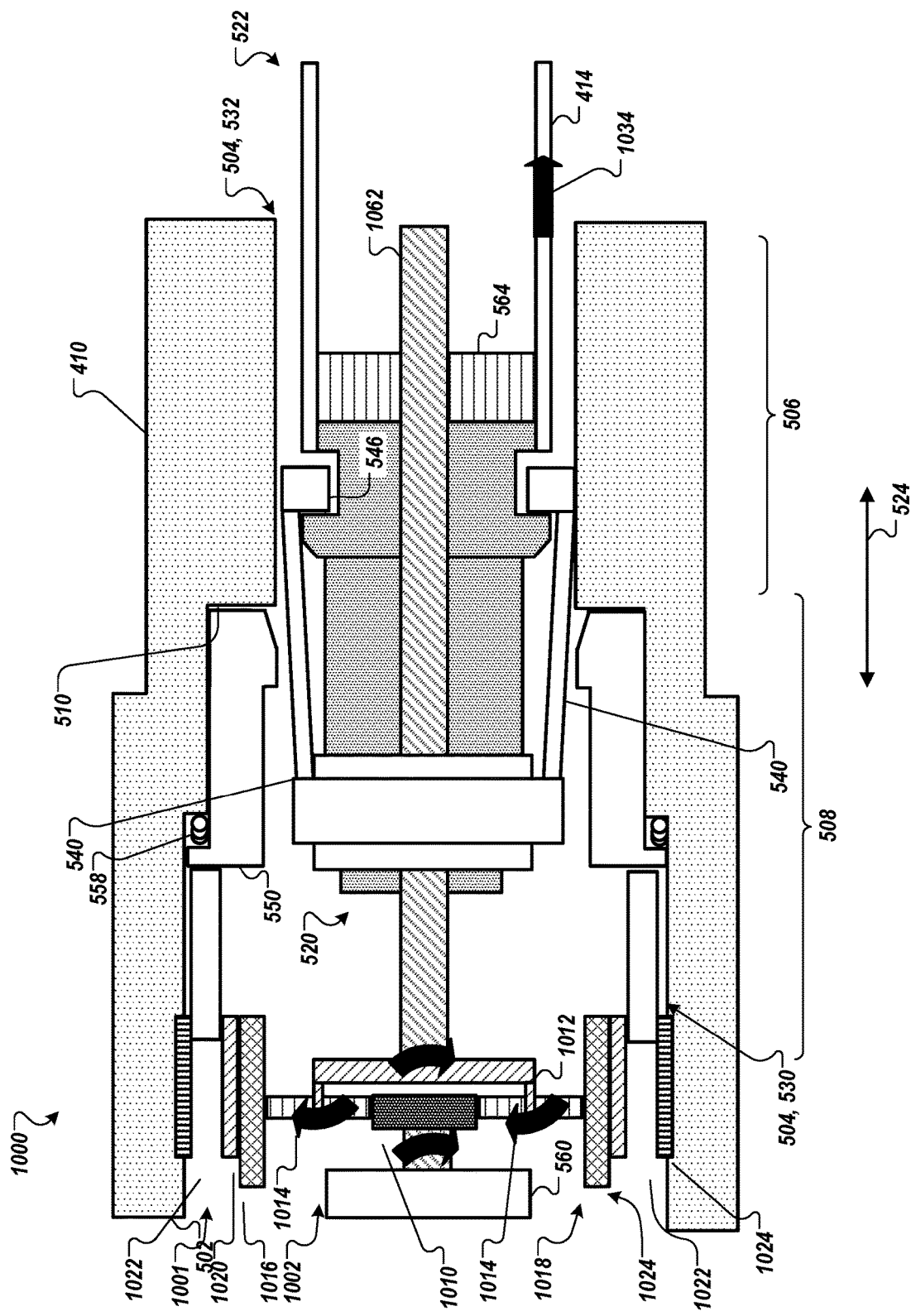
Figure 13:
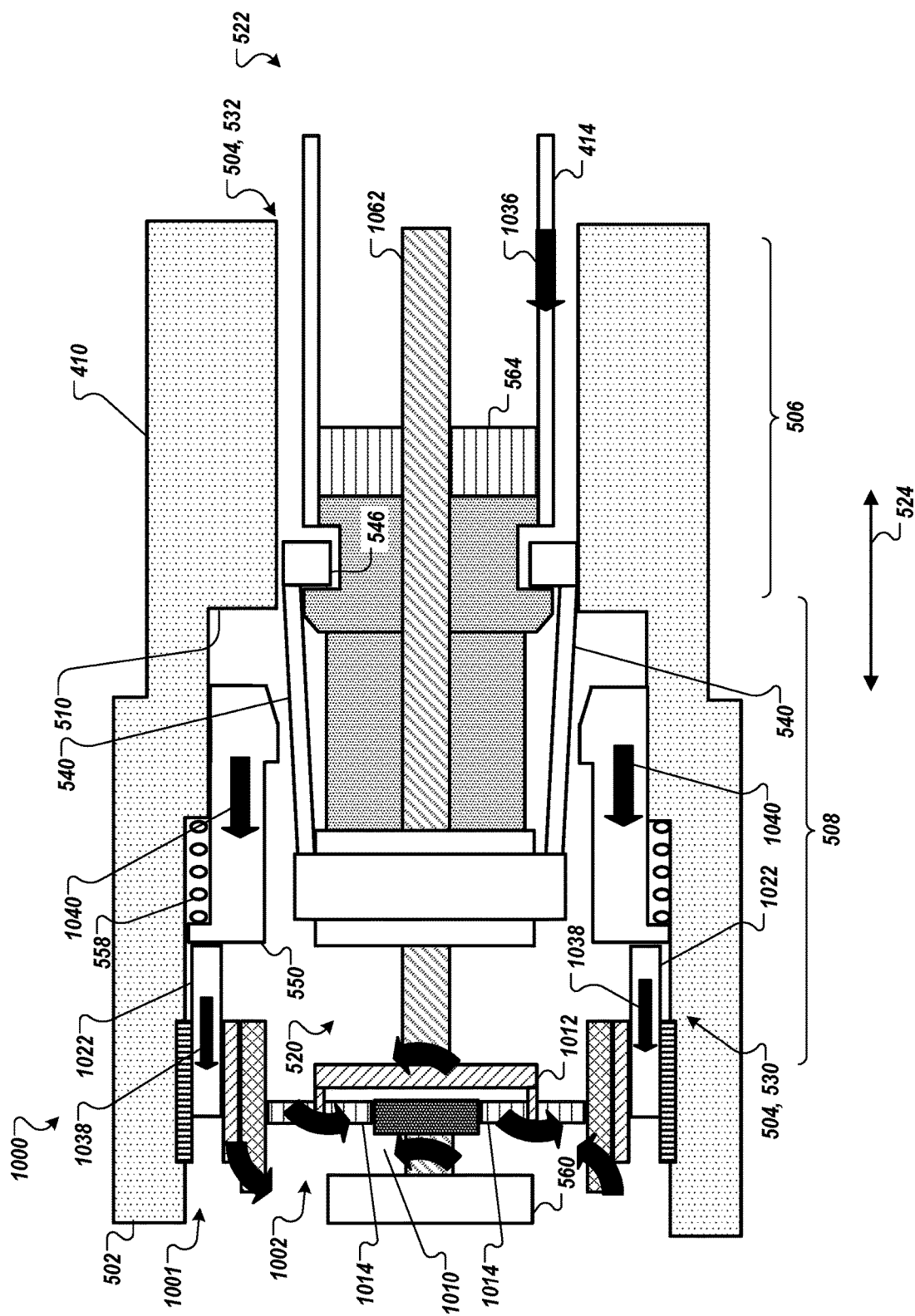

Referring now to FIG. 12, with the lock driver 1022 in an extended configuration, further rotation of the ring gear assembly 1016 is substantially prevented. In this configuration, torque from the sun gear assembly 1010 is transmitted to the planet gear carrier assembly 1012. With the lock fingers 540 in the retracted position, the threaded shaft 1062 can be rotated by the planet gear carrier assembly 1012. Rotation of the threaded shaft 1062 urges linear movement of the nut 564 and the piston rod 414, as indicated by arrows 1034.

The piston rod 414 can be extended when the motor 560 is energized to rotate the threaded shaft 1062 in a first direction (e.g., clockwise), and can be retracted by energizing the motor 560 to rotate the threaded shaft 1062 in a second, opposite direction (e.g., counter-clockwise), causing the piston rod 414 to retract as indicated by arrows 1036. Opposite rotation of the motor 560 also causes retraction of the lock driver 1022, as indicated by arrows 1038. With the lock driver 1022 retracted, the bias member 558 urges retraction of the sleeve 550, as indicated by arrows 1040. With the sleeve 550 retracted, the lock fingers 540 can return to the extended configuration (e.g., as shown in the example configuration of FIG. 10).

Figure 14:
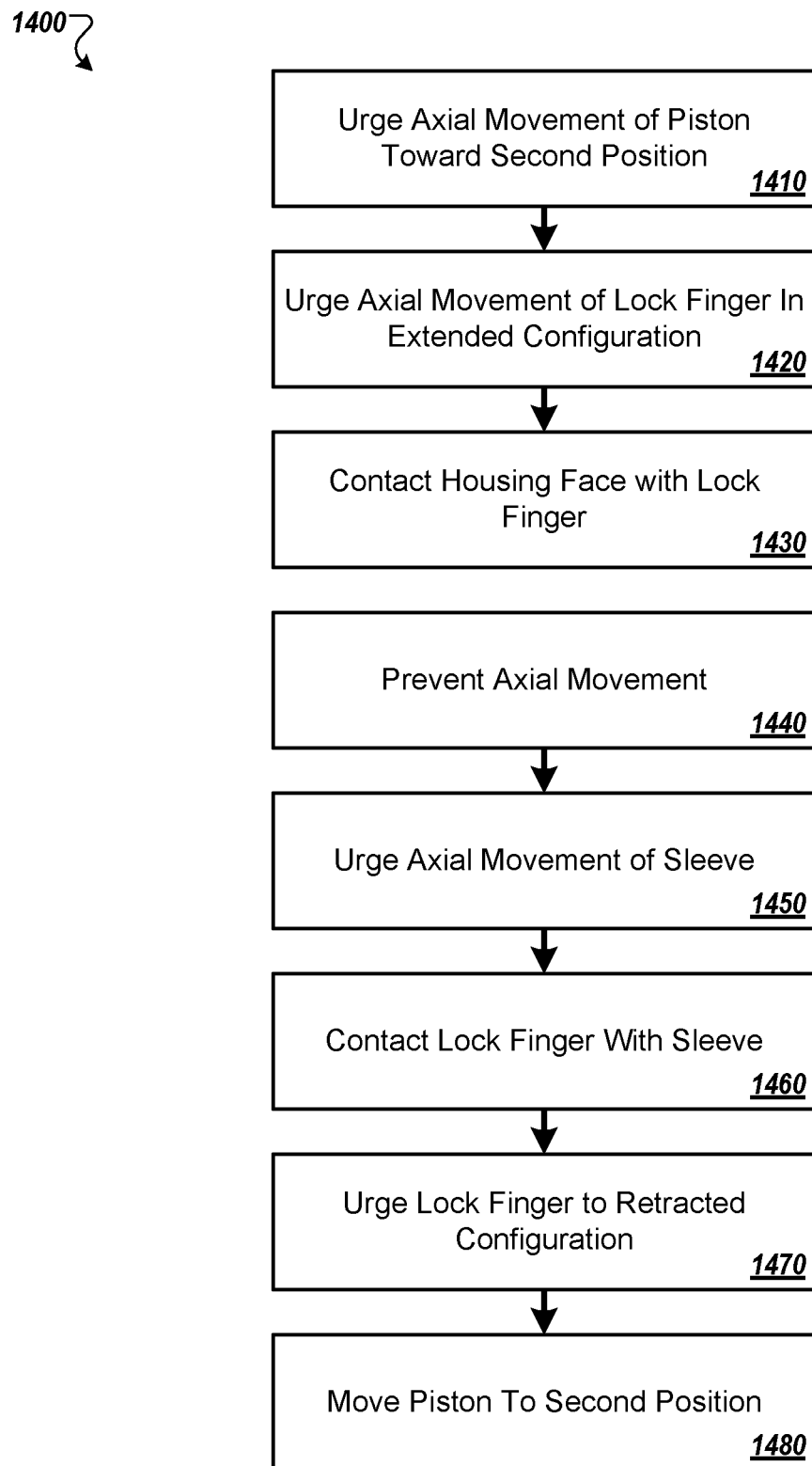
FIG. 14 is a flow diagram of an example process of locking a linear actuator.

FIG. 14 is a flow diagram of an example process 1400 for locking a linear actuator. In some implementations, the process 1400 can be performed by the example linear lock assembly 500 or 1000 of FIGS. 4-13.

At 1401, axial movement of a lock carrier is urged within an axial cavity defined by an inner surface of a housing, away from a first lock carrier position and toward a second lock carrier position. For example, the example lock carrier 541 can be urged from the example position shown in FIG. 7 to the example position shown in FIG. 5.

At 1420, the lock carrier urges axial movement of a lock finger affixed to the lock carrier at a first finger end and extending away from the lock carrier to a second finger end in an extended configuration. For example, the example lock fingers 540 can extend from the example configuration shown in FIG. 7 to the example configuration shown in FIG. 5.

At 1430, the second finger end contacts a face defined by the inner surface between a first housing portion wherein the axial cavity has a first lateral size to a second housing portion wherein the axial cavity has a second lateral size that is larger than the first lateral size. For example, the example finger end 544 can contact the face 510.

At 1440, the contacting prevents movement of the lock carrier to the second lock carrier position, the preventing including contacting, by the second finger end, a second face defined by the lock carrier, and transferring, by the second finger end, an axial force of the lock carrier to the housing. For example, force from the example piston rod 414 can be transmitted through the lock finger 540 to the housing 410.

At 1450, movement of a sleeve is urged axially from a first sleeve position to a second sleeve position within the axial cavity. For example, the sleeve 550 can be moved axially within the housing portion 508 between a first sleeve position (e.g., as shown in FIGS. 5, 8, and 9) and a second sleeve position (e.g., as shown in FIGS. 6 and 7).

At 1460, the lock finger is contacted by the sleeve. At 1470, the sleeve urges the lock finger from the extended configuration to a retracted configuration in which the lock finger fits within the first housing portion. For example, as the sleeve 550 is moved axially within the housing portion 508 between the first sleeve position (e.g., as shown in FIGS. 5, 8, and 9) and the second sleeve position configuration (e.g., as shown in FIGS. 6 and 7), the sleeve can contact the lock fingers 540 and urge the lock fingers 540 to the retracted configuration (e.g., as shown in FIGS. 6 and 7).

At 1480, the lock carrier is moved to the second lock carrier position. For example, with the lock fingers 540 retracted, the piston rod 414 and the lock carrier 541 can be moved from the example configuration shown in FIG. 5 to the example configuration shown in FIG. 7.

In some implementations, the process 1400 can include urging, by a nut engaged upon a threaded shaft of a rotary-to-linear motion converter assembly, axial movement of the lock carrier within the axial cavity. For example, rotation of the threaded shaft 562 can cause linear movement of the nut 564.

In some implementations, an electric motor can urge rotary motion of the threaded shaft, and rotary motion of the threaded shaft can urge linear movement of the nut. For example, the motor 560 can be an electric motor that can be configured to rotate the threaded shaft 562 to urge linear movement of the nut 564.

In some implementations, the process 1400 can include urging, by linear movement of the nut, axial motion of a piston. For example, the nut 564 is affixed to the piston rod 414. As the nut 564 moves, so too can the piston rod 414.

In some implementations, the process 1400 can include urging rotation of the threaded shaft by a planetary gearbox assembly in a first configuration, urging rotation of a ring gear assembly of the planetary gearbox assembly in a second configuration, urging, based on rotation of the ring gear assembly, linear movement of a lock driver assembly of a rotary-to-linear motion converter assembly, and urging axial movement of the sleeve based on linear movement of the lock driver assembly. For example, when the example linear lock assembly 1000 of FIGS. 10-13 is locked, the example planetary gearbox assembly 1002 can operate in a first mode to actuate the sleeve 550 to unlock the lock fingers 540. With the sleeve 550 fully extended, the example planetary gearbox assembly 1002 can operate in a second mode to transfer torque to the threaded shaft 1062.

In some implementations, the process 1400 can include urging movement of the sleeve by a bias member. For example, the example bias member 558 can urge linear movement of the sleeve 550.

In some implementations, the process 1400 can include urging movement of the sleeve axially from the second sleeve position to the first sleeve position within the axial cavity, urging the lock carrier away from the second lock carrier position to the first lock carrier position, passing the second finger end out of the first housing portion, past the face, into the second housing portion, and extending the lock finger away from the lock carrier from the retracted configuration to the extended configuration. For example, linear lock assembly 500 can be reconfigured from the example configuration shown in FIG. 7 to the configuration shown in FIG. 5, in which the sleeve 550 is retracted to permit the lock fingers 540 to extend to the extended configuration as the lock carrier 541 moves to the retracted configuration.

In some implementations, the example process 1400 can include extending, by a bias member, the lock finger away from the lock carrier from the retracted configuration to the extended configuration. For example, lock fingers 540 can be configured to be biased toward the locked configuration. In some embodiments, the finger ends 542 can be fixed to the piston end 520 and the lock finger 540 can be formed of a compliant (e.g., spring) material that can bend and allow the finger end 544 to move between the extended and retracted positions.

In some implementations, the process 1400 can include urging, by an electromechanical actuator, axial movement of the sleeve. For example, the sleeve 550 can be moved from the first sleeve position to the second sleeve position by energizing a linear actuator 526 (e.g., an electrical or fluid-powered solenoid).

In some implementations, the process 1400 can include urging movement of the sleeve by a bias member configured to urge movement of the sleeve axially from the second sleeve position to the first sleeve position. For example, the example bias member 558 can urge linear movement of the sleeve 550.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A linear actuator lock apparatus, comprising:
   a housing having an inner surface defining an axial cavity comprising:
      a first housing portion wherein the axial cavity has a first lateral size;
      a second housing portion wherein the axial cavity has a second lateral size that is larger than the first lateral size; and
      a face defined by the inner surface from the first housing portion to the second housing portion;
   a lock assembly comprising:
      a lock carrier configured for axial movement within the axial cavity between a first lock carrier position and a second lock carrier position; and
      a lock finger affixed to the lock carrier at a first finger end and extending away from the lock carrier to a second finger end, wherein the second finger end is configured to contact the face axially and contact the lock carrier axially in an extended configuration and fit within the first housing portion in a retracted configuration; and
   a sleeve arranged within the second housing portion and configured to move axially within the second housing portion between a first sleeve position in which the lock finger is permitted to extend to the extended configuration and a second sleeve position configured to contact the lock finger and urge the lock finger to the retracted configuration.

2. The linear actuator lock apparatus of claim 1, wherein the second finger end is configured to contact the face axially and to contact the lock carrier axially in the extended configuration.

3. The linear actuator lock apparatus of claim 1, wherein the lock finger is configured to prevent movement of the lock carrier toward the second lock carrier position in the extended configuration, and permit movement of the lock carrier toward the second lock carrier position in the retracted configuration.

4. The linear actuator lock apparatus of claim 1, further comprising a bias member configured to bias the lock finger away from the retracted configuration and toward the extended configuration.

5. The linear actuator lock apparatus of claim 1, wherein the sleeve defines an axial bore, and the second finger end is configured to at least partly extend within the axial bore in the second sleeve position.

6. The linear actuator lock apparatus of claim 1, further comprising a bias member configured to urge the sleeve toward the first sleeve position.

7. The linear actuator lock apparatus of claim 1, further comprising a rotary-to-linear motion converter assembly comprising a threaded shaft and a nut threadedly engaged upon the threaded shaft, wherein the nut is configured to urge axial movement of the lock carrier within the axial cavity.

8. The linear actuator lock apparatus of claim 7, wherein the nut is further configured to urge axial movement of a piston rod.

9. The linear actuator lock apparatus of claim 8, wherein the housing is configured to be affixed to an aircraft structure and a piston rod is configured to be affixed to a moveable aircraft component.

10. The linear actuator lock apparatus of claim 7, further comprising an electric motor configured to urge rotation of the threaded shaft.

11. The linear actuator lock apparatus of claim 7, further comprising a second rotary-to-linear motion converter configured to urge the sleeve from the first sleeve position toward the second sleeve position, the rotary-to-linear motion converter assembly comprising:
- a planetary gearbox assembly comprising:
  - a sun gear assembly configured to receive rotary motion from a rotary actuator;
  - a plurality of planet gears configured to be driven by the sun gear assembly;
  - a ring gear assembly having a collection of gear teeth configured to engage the plurality of planet gears extending radially inward, and a screw thread extending radially outward; and
  - a planet gear carrier assembly configured to be driven by the plurality of planet gears and configured to (1) urge rotation of the threaded shaft in a first configuration and (2) urge rotation of the ring gear assembly in a second configuration; and
- a lock driver assembly comprising a collection of teeth configured to be engaged by the screw thread and to move linearly based on rotation of the ring gear assembly, wherein linear movement of the lock driver assembly is configured to urge movement of the sleeve.

12. The linear actuator lock apparatus of claim 1, wherein the sleeve is configured to be urged from the first sleeve position toward the second sleeve position by an electromechanical actuator.

13. A method of locking a linear actuator, the method comprising:
- urging axial movement of a lock carrier within an axial cavity defined by an inner surface of a housing, away from a first lock carrier position and toward a second lock carrier position;
- urging, by the lock carrier, axial movement of a lock finger affixed to the lock carrier at a first finger end and extending away from the lock carrier to a second finger end in an extended configuration;
- contacting, by the second finger end, a face defined by the inner surface between a first housing portion wherein the axial cavity has a first lateral size to a second housing portion wherein the axial cavity has a second lateral size that is larger than the first lateral size;
- preventing, by the contacting, movement of the lock carrier to the second lock carrier position, the preventing comprising:
  - contacting, by the second finger end, a second face defined by the lock carrier; and
  - transferring, by the second finger end, an axial force of the lock carrier to the housing;
- urging movement of a sleeve axially from a first sleeve position to a second sleeve position within the axial cavity;
- contacting, by the sleeve, the lock finger;
- urging, by the sleeve, the lock finger from the extended configuration to a retracted configuration in which the lock finger fits within the first housing portion; and
- moving the lock carrier to the second lock carrier position.

14. The method of claim 13, further comprising urging, by a nut engaged upon a threaded shaft of a rotary-to-linear motion converter assembly, axial movement of the lock carrier within the axial cavity.

15. The method of claim 14, further comprising:
- urging, by an electric motor, rotary motion of the threaded shaft; and
- urging, by rotary motion of the threaded shaft, linear movement of the nut.

16. The method of claim 15, further comprising urging, by linear movement of the nut, axial motion of a piston.

17. The method of claim 14, further comprising:
- urging rotation of the threaded shaft by a planetary gearbox assembly in a first configuration;
- urging rotation of a ring gear assembly of the planetary gearbox assembly in a second configuration;
- urging, based on rotation of the ring gear assembly, linear movement of a lock driver assembly of a rotary-to-linear motion converter assembly; and
- urging axial movement of the sleeve based on linear movement of the lock driver assembly.

18. The method of claim 13, further comprising urging movement of the sleeve by a bias member.

19. The method of claim 13, further comprising:
- urging movement of the sleeve axially from the second sleeve position to the first sleeve position within the axial cavity;
- urging the lock carrier away from the second lock carrier position to the first lock carrier position;
- passing the second finger end out of the first housing portion, past the face, into the second housing portion; and
- extending the lock finger away from the lock carrier from the retracted configuration to the extended configuration.

20. The method of claim 19, further comprising extending, by a bias member, the lock finger away from the lock carrier from the retracted configuration to the extended configuration.

21. The method of claim 19, further comprising urging, by an electromechanical actuator, axial movement of the sleeve.

22. The method of claim 19, further comprising, urging movement of the sleeve by a bias member configured to urge movement of the sleeve axially from the second sleeve position to the first sleeve position.

23. A thrust reverser actuator system comprising:
- an airframe structure;
- a thrust reverser cowl configured to move relative to the airframe structure;
- a linear actuator configured to move the thrust reverser cowl relative to the airframe structure, and comprising:
  - a housing having an inner surface defining an axial cavity comprising:
    - a first housing portion wherein the axial cavity has a first lateral size;
    - a second housing portion wherein the axial cavity has a second lateral size that is larger than the first lateral size; and
    - a face defined by the inner surface from the first housing portion to the second housing portion;
  - a lock carrier configured for axial movement within the axial cavity between a first lock carrier position and a second lock carrier position; and
  - a lock apparatus comprising:
    - a lock finger affixed to the lock carrier at a first finger end and extending away from the lock carrier to a second finger end, wherein the second finger end is configured to contact the face axially and contact the lock carrier axially in an extended configuration and fit within the first housing portion in a retracted configuration; and a sleeve arranged within the second housing portion and configured to move axially within the second housing portion between a first sleeve position in which the lock finger is permitted to extend to the extended configuration and a second sleeve position configured to contact the lock finger and urge the lock finger to the retracted configuration.

24. The thrust reverser actuator system of claim 23, wherein the lock finger is configured to prevent movement of the lock carrier toward the second lock carrier position in the extended configuration, and permit movement of the lock carrier toward the second lock carrier position in the retracted configuration.

25. The thrust reverser actuator system of claim 23, further comprising an electromechanical actuator, wherein the lock carrier is configured to be urged from the first lock carrier position toward the second lock carrier position by electromechanical force.

26. The thrust reverser actuator system of claim 23, further comprising a second rotary-to-linear motion converter configured to urge the sleeve from the first sleeve position toward the second sleeve position, the second rotary-to-linear motion converter comprising:
    a planetary gearbox assembly comprising:
        a sun gear assembly configured to receive rotary motion from a rotary actuator;
        a plurality of planet gears configured to be driven by the sun gear assembly;
        a ring gear assembly having a collection of gear teeth configured to engage the plurality of planet gears extending radially inward, and a screw thread extending radially outward; and
        a planet gear carrier assembly configured to be driven by the plurality of planet gears and configured to urge rotation of the ring gear assembly; and
    a lock driver assembly comprising a collection of teeth configured to be engaged by the screw thread and to move linearly based on rotation of the ring gear assembly, wherein linear movement of the lock driver assembly is configured to urge movement of the sleeve.

* * * * *